(12) United States Patent
Phillips et al.

(10) Patent No.: US 11,846,261 B2
(45) Date of Patent: Dec. 19, 2023

(54) INJECTOR NOZZLE SPRAY HOLE WITH VENTURI AND AIR ENTERTAINMENT FEATURE

(71) Applicant: Cummins Inc., Columbus, IN (US)

(72) Inventors: Ross A. Phillips, Columbus, IN (US); Matthew B. State, Indianapolis, IN (US); Frank Husmeier, Columbus, IN (US); Steven Valentin, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/916,261

(22) PCT Filed: Feb. 16, 2021

(86) PCT No.: PCT/US2021/018213
§ 371 (c)(1),
(2) Date: Sep. 30, 2022

(87) PCT Pub. No.: WO2021/202006
PCT Pub. Date: Oct. 7, 2021

(65) Prior Publication Data
US 2023/0220823 A1    Jul. 13, 2023

Related U.S. Application Data

(60) Provisional application No. 63/002,774, filed on Mar. 31, 2020.

(51) Int. Cl.
*F02M 55/00* (2006.01)
*F02M 61/16* (2006.01)
*F02M 29/06* (2006.01)

(52) U.S. Cl.
CPC .......... *F02M 55/008* (2013.01); *F02M 29/06* (2013.01); *F02M 61/162* (2013.01)

(58) Field of Classification Search
CPC .. F02M 55/008; F02M 61/162; F02M 61/163; F02M 29/06
See application file for complete search history.

(56) References Cited

U.S. PATENT DOCUMENTS

| 4,280,661 A | 7/1981 | Tanasawa |
|---|---|---|
| 5,054,456 A | 10/1991 | Rush |

(Continued)

FOREIGN PATENT DOCUMENTS

| GB | 2129875 | 11/1983 |
|---|---|---|
| WO | 2007056832 A1 | 5/2007 |

(Continued)

OTHER PUBLICATIONS

International Search Report and Written Opinion for International patent application No. PCT/US2021/018213, filed Feb. 16, 2021, dated May 4, 2021.

*Primary Examiner* — Jacob M Amick
(74) *Attorney, Agent, or Firm* — Taft, Stettinius & Hollister LLP

(57) ABSTRACT

Apparatuses and methods for fuel injection are disclosed. The apparatus includes an inner sac with one or more primary passages extending therefrom. The one or more primary passages inject fuel therethrough and comprising a first portion, a second portion, and a third portion, where the second portion is disposed between the first portion and the third portion and has a cross-sectional area smaller than that of both the first portion and the third portion. The apparatus also includes one or more secondary passages extending from an outer surface of the apparatus to fluidly couple with the second portion of the one or more primary passages. The one or more secondary passages inject air to form fuel-and-air mixture with the fuel injected from the one or more primary passages.

19 Claims, 7 Drawing Sheets

(56) References Cited

U.S. PATENT DOCUMENTS

| | | | |
|---|---|---|---|
| 5,878,730 | A | 3/1999 | Williams |
| 8,322,325 | B2 | 12/2012 | Rogak |
| 8,544,770 | B2 | 10/2013 | Limmer |
| 9,840,992 | B2 | 12/2017 | Duncan |
| 9,909,549 | B2 | 3/2018 | Mueller |
| 10,077,724 | B1 | 9/2018 | Kurtz et al. |
| 2011/0068188 | A1* | 3/2011 | Laimboeck ......... F02B 23/0669 239/601 |
| 2019/0178214 | A1 | 6/2019 | Zhang et al. |

FOREIGN PATENT DOCUMENTS

| | | |
|---|---|---|
| WO | 2011028283 A1 | 3/2011 |
| WO | 2014167395 A1 | 10/2014 |

* cited by examiner

INJECTOR NOZZLE SPRAY HOLE WITH VENTURI AND AIR ENTERTAINMENT FEATURE

CROSS-REFERENCE TO RELATED APPLICATIONS

This application is a U.S. national stage of and claim priority to International Patent Application No. PCT/US2021/018213, filed Feb. 16, 2021, which claims priority to U.S. Provisional Application No. 63/002,774, filed Mar. 31, 2020, the contents of which are incorporated herein by reference in their entirety.

FIELD OF THE DISCLOSURE

The present disclosure relates generally to engine fuel systems, especially to fuel injector configurations used in such engine fuel systems.

BACKGROUND OF THE DISCLOSURE

One of the most important features of an engine fuel system is the atomization of automotive liquid fuels as performed by fuel injectors. The fuel injectors supply fuel via fuel injector tips (some known examples of fuel injector tips include MicroSac tip and VCR tip) to the combustion chamber of an engine, and the combustion occurs when the injected fuel spray mixes with the air within combustible limits. Specifically, air entrainment which mixes air with fuel droplets, vaporization, homogenization, pressure, and heat are involved in aiding the bursting of the fuel droplets in the fuel spray to start the combustion process. The fuel droplet size typically has a Santer Mean Diameter (SDM) of, for example, approximately 10 micron-meters or less. SDM is measured as a 3rd power of volume and 2nd power of surface. The fuel plume has a high kinetic energy, with typical speed within the range of, for example, approximately 300 meters-per-second to approximately 700 meters per second. The fuel plume will typically have an opening angle of approximately 3 degrees to approximately 7 degrees.

FIG. 1 shows one example of a conventional fuel injector component 100. The fuel injector 100 has a sac 102 with nozzle holes or spray holes 104 through which the fuel is injected. The body of the fuel injector 100 has an inner surface or seat 106 which receives a needle component 108, and the needle tip 110 of the needle 108 is inserted into the opening defined by the seat 106 until an edge 112 of the needle 108 comes into contact with the seat 106, thus preventing the needle 108 from progressing further. As the needle 108 is raised by an actuation device, the high pressure fuel is allowed to flow into the sac 102 and out the nozzle holes 104. It would be advantageous to improve the process of mixing of fuel and air, in order to achieve more efficient combustion.

Fuel injectors include a nozzle tip that extends into a combustion chamber to inject fuel under a controlled injection process. The combustion chamber also receives air from one or more inlet ports which mixes with the fuel to create a charge for combustion (either spark-ignited or compression ignited). The specific characteristics of the fuel plume injected into the combustion chamber influence the efficiency of the combustion, which affects fuel consumption and emissions. In general, a high degree of mixing of the air and fuel is desirable to provide efficient combustion. Thus, there is a need to provide an improved fuel injector with increased air/fuel mixing.

SUMMARY

Various embodiments of the present disclosure relate to apparatuses for fuel injection. The apparatus includes an inner sac with one or more primary passages extending therefrom. The one or more primary passages inject fuel therethrough and comprising a first portion, a second portion, and a third portion. The second portion is disposed between the first portion and the third portion and has a cross-sectional area smaller than that of both the first portion and the third portion. The apparatus also has one or more secondary passages extending from an outer surface of the apparatus to fluidly couple with the second portion of the one or more primary passages. The one or more secondary passages inject air therethrough to form fuel-and-air mixture with the fuel injected from the one or more primary passages.

In one example, each of the one or more primary passages defines a first central axis, each of the one or more secondary passages defines a second central axis, and the second central axis is offset from the first central axis so as to be nonplanar with each other. In one example, the first and second axes cause a swirling motion in the injected air when mixing with the fuel to form the fuel-and-air mixture. In one example, a location of the first central axis is defined by a centroid on a cross-section of the primary passage, and a location of the second central axis is defined by a centroid on a cross-section of the secondary passage. In one example, each of the one or more primary passages is angularly offset from a longitudinal axis of the apparatus, and each of the one or more secondary passages is angularly offset from the one or more primary passages. In one example, each of the one or more primary passages is fluidly coupled with only one of the one or more secondary passages. In one example, each of the one or more primary passages has a configuration resembling an hourglass shape. In one example, the one or more secondary passages have a cylindrical configuration. In one example, the one or more secondary passages have a frustoconical configuration. In one example, the one or more secondary passages are configured to inject the air therethrough using a fluid pressure differential between the one or more primary passages and the one or more secondary passages. In one example, a relationship between a length ("B") of the primary passage and a distance ("A") of the second portion from the outer surface, as measured along the first central axis, is represented as: $0<A/B<1$. In one example, a relationship between a diameter ("V") of the second portion and a diameter ("C") of the first portion is represented as: $0<V/C<1$. In one example, a relationship between a diameter ("V") of the second portion and a diameter ("D") of the third portion is represented as: $0<V/D<1$.

Additional embodiments of the present disclosure relate to methods of fuel injection in an engine. The method includes opening a fuel injecting apparatus in response to an operation signal from an engine control system; inserting fuel through a primary passage formed in the fuel injection apparatus; directing air into the primary passage through a secondary passage that is fluidly coupled with a second portion of the primary passage, and combusting a mixture of air and fuel inside the engine. The primary passage includes a first portion, a second portion, and a third portion. The second portion is disposed between the first portion and the third portion and has a cross-sectional area smaller than that of both the first portion and the third portion.

In one example, redirecting the air into the fuel passage occurs in response to a pressure differential the primary passage and the secondary passage, such that the primary passage has a lower pressure than the secondary passage.

Additional embodiments of the present disclosure relate to engine systems. The engine system includes a plurality of cylinder heads, each cylinder head defining a combustion chamber, a plurality of fuel injectors, each fuel injector coupled with one of the plurality of cylinder heads, and a plurality of pistons, each piston coupled to the combustion chamber of the one of the plurality of cylinder heads. The fuel injector includes an inner sac with one or more primary passages extending therefrom, the one or more primary passages configured to inject fuel into the combustion chamber and comprising a first portion, a second portion, and a third portion. The second portion is disposed between the first portion and the third portion and has a cross-sectional area smaller than that of both the first portion and the third portion. The fuel injector further includes one or more secondary passages extending from the combustion chamber to fluidly couple with the second portion of the one or more primary passages. The one or more secondary passages inject air from the combustion chamber to form fuel-and-air mixture with the fuel injected from the one or more primary passages.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein FIG. 1 a partial cross-sectional view of a prior-art example of a fuel injector as known in the art.

DETAILED DESCRIPTION OF THE DISCLOSURE

Figure 1:
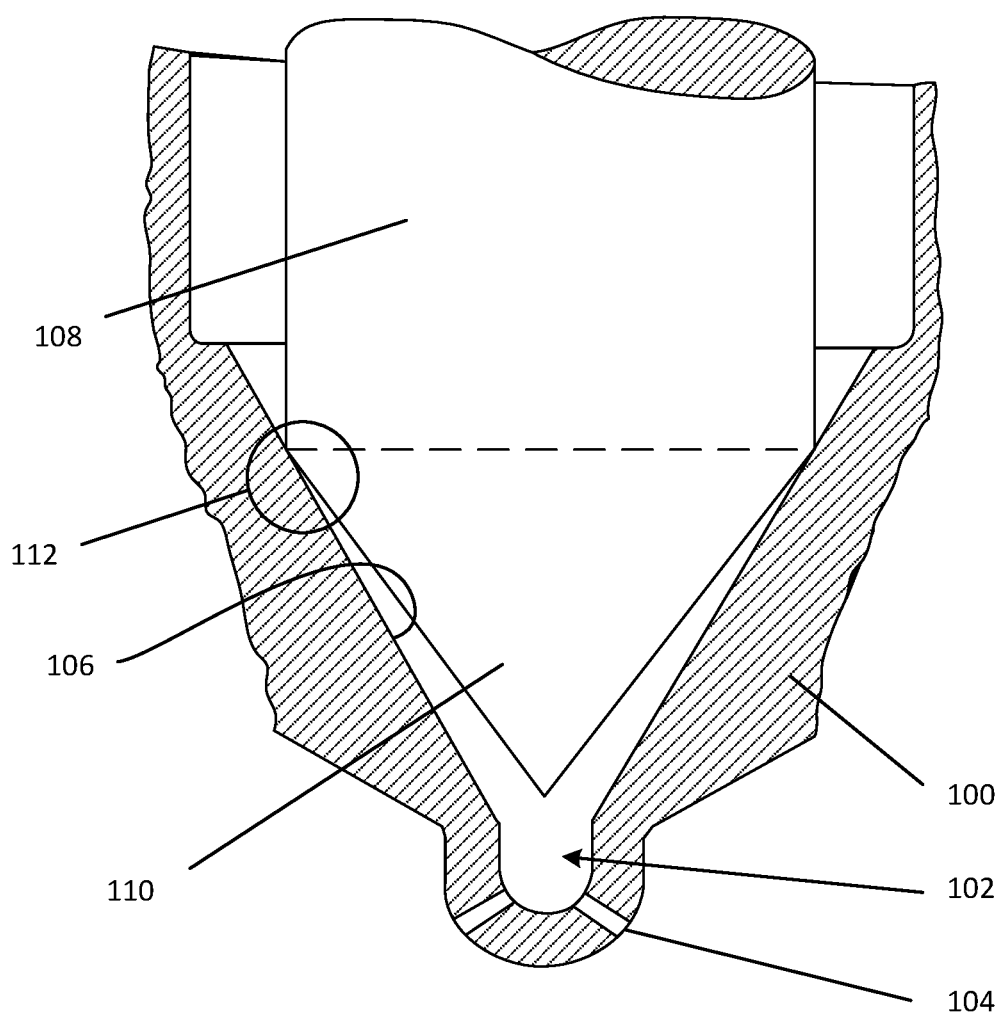

In the following detailed description, reference is made to the accompanying drawings which form a part hereof, and in which is shown by way of illustration specific embodiments in which the present disclosure is practiced. These embodiments are described in sufficient detail to enable those skilled in the art to practice the present disclosure, and it is to be understood that other embodiments can be utilized and that structural changes can be made without departing from the scope of the present disclosure. Therefore, the following detailed description is not to be taken in a limiting sense, and the scope of the present disclosure is defined by the appended claims and their equivalents.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments. Furthermore, the described features, structures, or characteristics of the subject matter described herein may be combined in any suitable manner in one or more embodiments.

For the purposes of promoting an understanding of the principles of the present disclosure, reference is now made to the embodiments illustrated in the drawings, which are described below. The exemplary embodiments disclosed herein are not intended to be exhaustive or to limit the disclosure to the precise form disclosed in the following detailed description. Rather, these exemplary embodiments were chosen and described so that others skilled in the art may utilize their teachings.

The terms "couples," "coupled," and variations thereof are used to include both arrangements wherein two or more components are in direct physical contact and arrangements wherein the two or more components are not in direct contact with each other (e.g., the components are "coupled" via at least a third component), but yet still cooperate or interact, with each other. Furthermore, the terms "couples," "coupled," and variations thereof refer to any connection for machine parts known in the art, including, but not limited to, connections with bolts, screws, threads, magnets, electromagnets, adhesives, friction grips, welds, snaps, clips, etc.

Throughout the present disclosure and in the claims, numeric terminology, such as first and second, is used in reference to various components or features. Such use is not intended to denote an ordering of the components or features. Rather, numeric terminology is used to assist the reader in identifying the component or features being referenced and should not be narrowly interpreted as providing a specific order of components or features.

Figure 2:
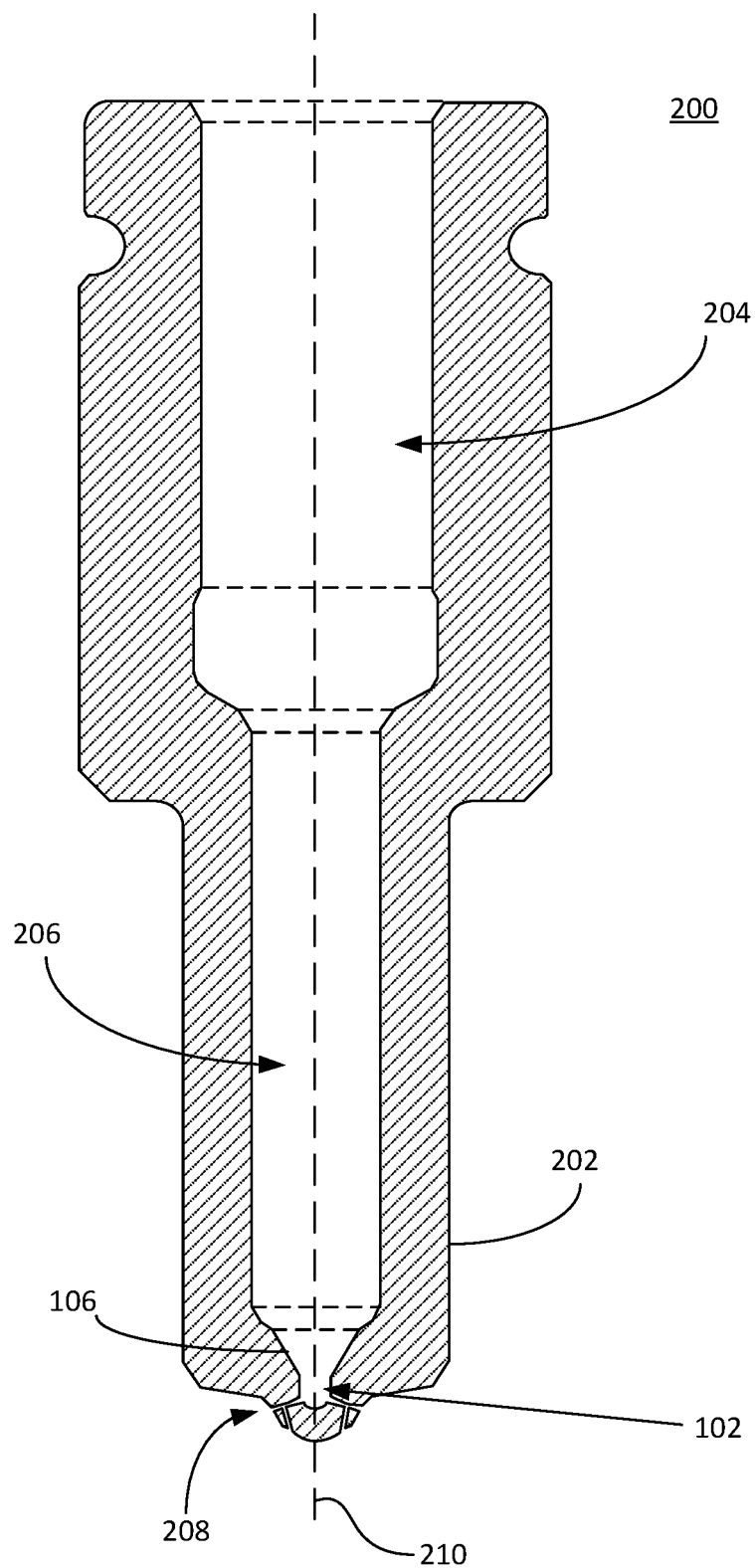
FIG. 2 is a cross-sectional view of a portion of a fuel injector according to one embodiment of the present disclosure.

FIG. 2 shows a partial cross-sectional view of an apparatus 200 which may be a fuel injector component, for example, and includes an apparatus housing 202 that defines a first portion 204 and a second portion 206 that is distal to and has a smaller cross-sectional area than the first portion 204. Distal to the second portion 206 is the seat 106 leading from the second portion 206 to the sac 102. In some examples, liquid fuel passes from the first portion 204 to the second portion 206 and then to the sac 102 before being injected into the atmosphere through one or more spray holes 208 located on an external surface of the apparatus 200. In the figure shown, there are two spray holes 208, but any number of spray holes may exist as appropriate. Also shown is a longitudinal axis 210 along which the portions 204 and 206 are oriented. In some examples, the plurality of spray holes 208 may be positioned to be symmetrical to each other with respect to the longitudinal axis 210.

Figure 3:
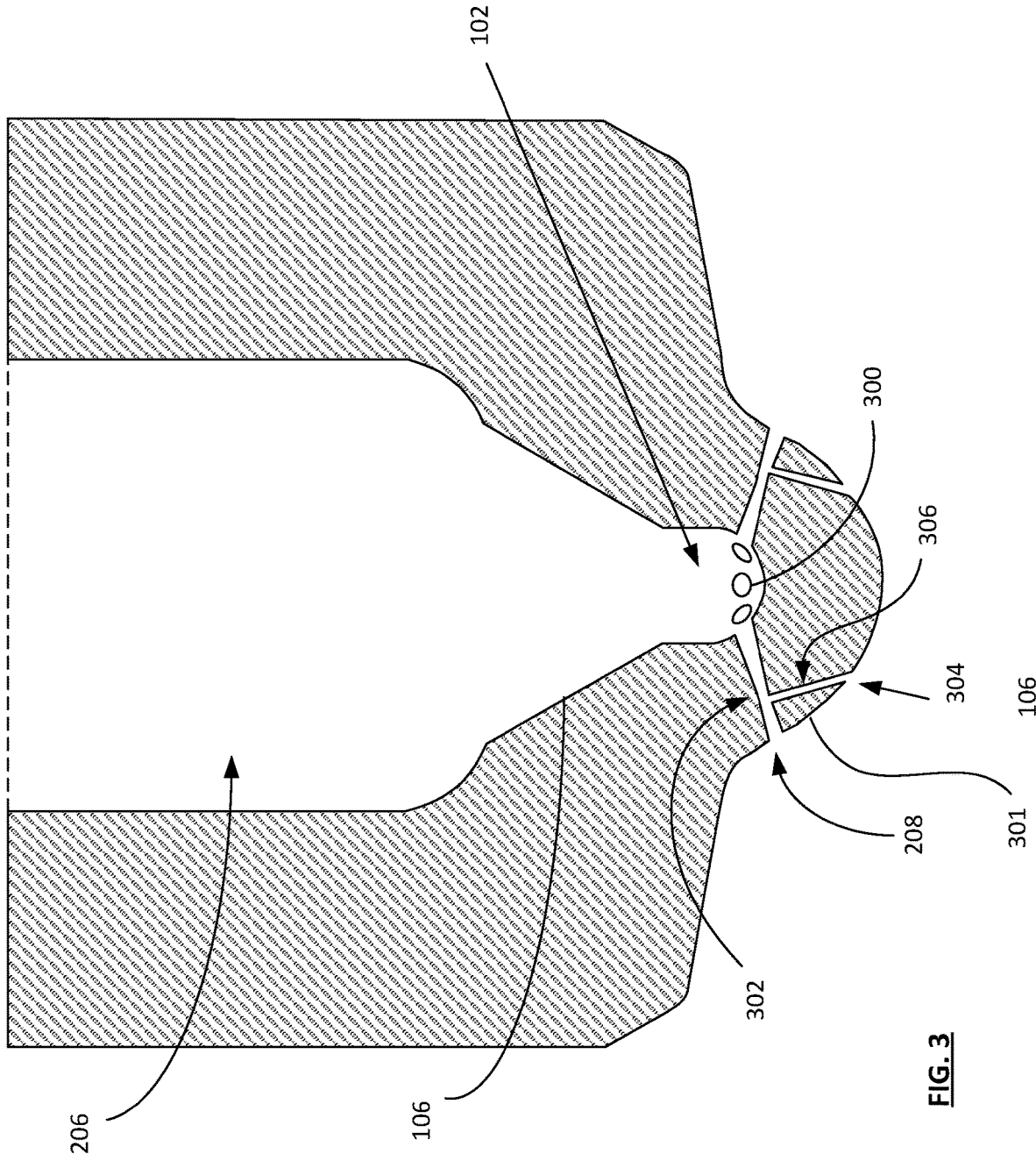
FIG. 3 is an enlarged, cross-sectional view of a portion of the fuel injector of FIG. 2.
Figure 4:
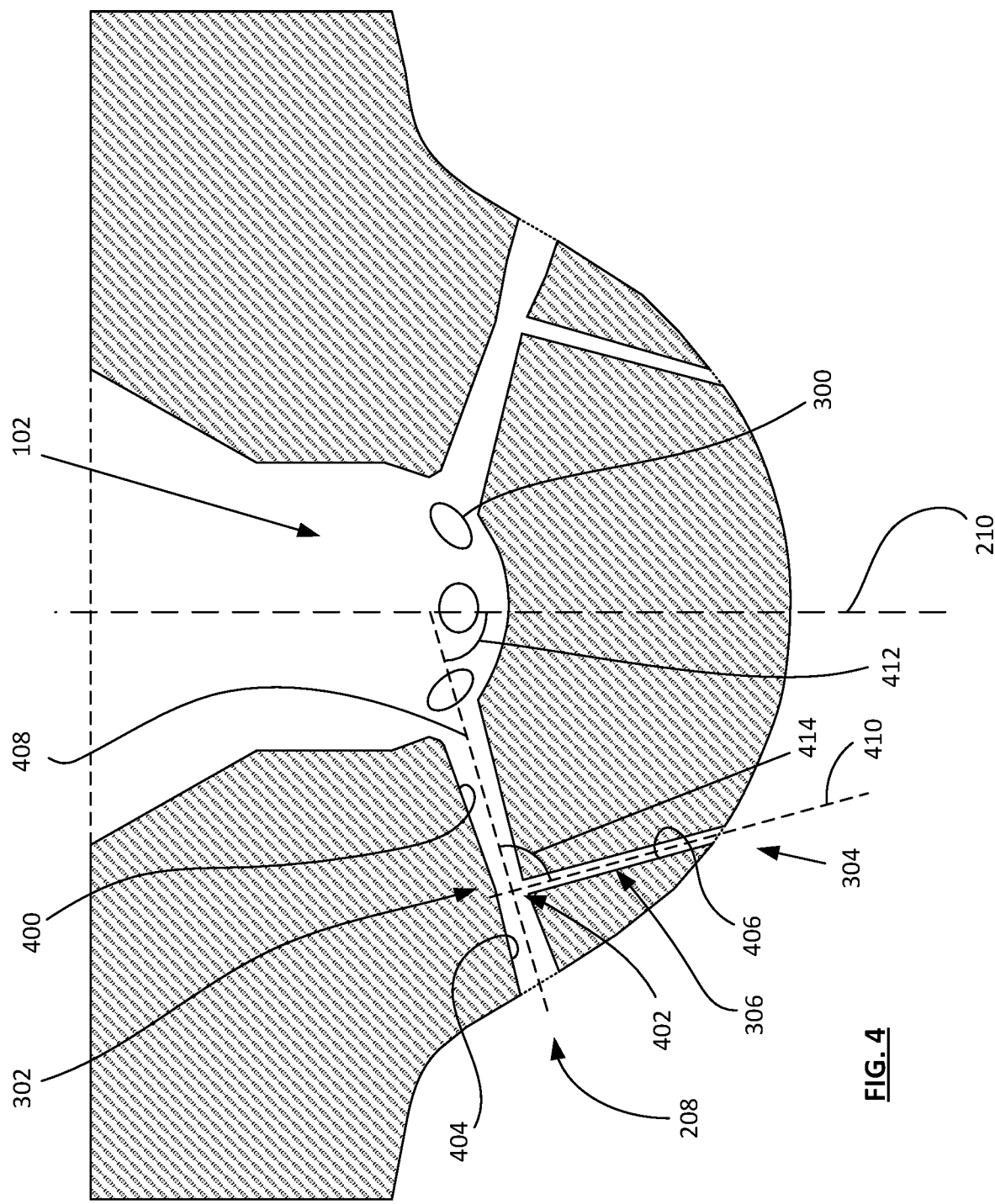
FIG. 4 is a further enlarged, cross-sectional view of a portion of the fuel injector of FIG. 2.

FIGS. 3 through 5 show the distal portion of the apparatus 200 in more detail. A plurality of exit holes 300 are shown, where each exit hole 300 extends from the sac 102 toward the respective spray hole 208 on an outer surface 301 of the apparatus 200 to form a primary passage 302. Although only three (3) exit holes are shown in the figures, the sac 102 may have any number of exit holes 300 extending therefrom. Also, a plurality of air holes or air entrainment holes 304 are also shown, where each of the air holes 304 extends from the outer surface 301 toward the primary passage 302 to form a secondary passage 306 which is also an air entrainment feature. Each primary passage 302 is fluidly coupled with a secondary passage 306 such that air can be injected into the primary passage 302 through the secondary passage 306 as further explained herein. In some embodiments, each primary passage 302 is fluidly coupled to only one secondary passage 306.

FIG. 4 shows a detailed view of the primary passage 302 and the secondary passage 304. The primary passage 302 has a Venturi geometry which somewhat resembles an hourglass shape, with a first portion 400, a second portion 402, and a third portion 404 having varying cross-sectional areas. As shown, the first portion 400, which is the portion closest to the exit hole 300, and the third portion 404, which is the portion closest to the spray hole 208, both have cross-sectional areas greater than that of the second portion 402, which positioned between the first portion 400 and the third portion 404. In some examples, the first portion 400, the second portion 402, and the third portion 404 all have circular cross-sections, whereas in other examples, the cross-sections may be ovular, polygonal, or any other shape as deemed suitable for the purpose. In some examples, the cross-sectional area of the second portion 402 is approximately between 20% and 30%, 30% and 50%, 50% and 70%, or 70% and 90%, as suitable, of the cross-sectional area of the first portion 400 or the third portion 404. In some examples, the cross-sectional area of the first portion 400 may be greater than, less than, or approximately the same as that of the third portion 404.

Furthermore, the secondary passage 306 defines a passage portion 406 which may have a cross-sectional area that is consistent throughout the entire length of the secondary passage 306, or the passage portion 406 may have a greater cross-sectional area in certain sections thereof as compared to other sections of the passage portion 406. In some examples, the passage portion 406 may be cylindrical, frustoconical, or any other suitable configuration.

The primary passage 302 defines a central axis 408 which extends from the exit hole 300 at an angle 412 with respect to the longitudinal axis 210 (the primary passage 302 is angularly offset from the longitudinal axis 210), and the secondary passage 306 defines another central axis 410 which extends from the spray hole 304 and fluidly contacts the primary passage 302 at another angle 414 (the secondary passage 306 is angularly offset from the primary passage 302). If the passages 302, 306 have circular cross-sections, the central axes 408, 410 would be positioned at the center of the circle that defines each cross-section. If the passages 302, 306 have non-circular cross-sections, such as ovular or polygonal cross-sections, for example, the central axes 408, 410 would be positioned at the centroids of the respective non-circular cross-sections.

The location where the secondary passage 306 comes into fluid contact with the primary passage 302 is the second portion 402 as previously explained, such that the secondary passage 306 is configured to fluid contact the primary passage 302 at a location with the smallest cross-sectional area or the smallest diameter, according to some embodiments. In some examples, the angle 412 is between about 20° and about 30°, 30° and about 40°, about 40° and about 50°, about 50° and about 60°, about 60° and about 70°, about 70° and about 80°, about 80° and about 90°, or any combination thereof. In some examples, the angle 414 is between about 20° and about 30°, 30° and about 40°, about 40° and about 50°, about 50° and about 60°, about 60° and about 70°, about 70° and about 80°, about 80° and about 90°, or any combination thereof.

Figure 5A:
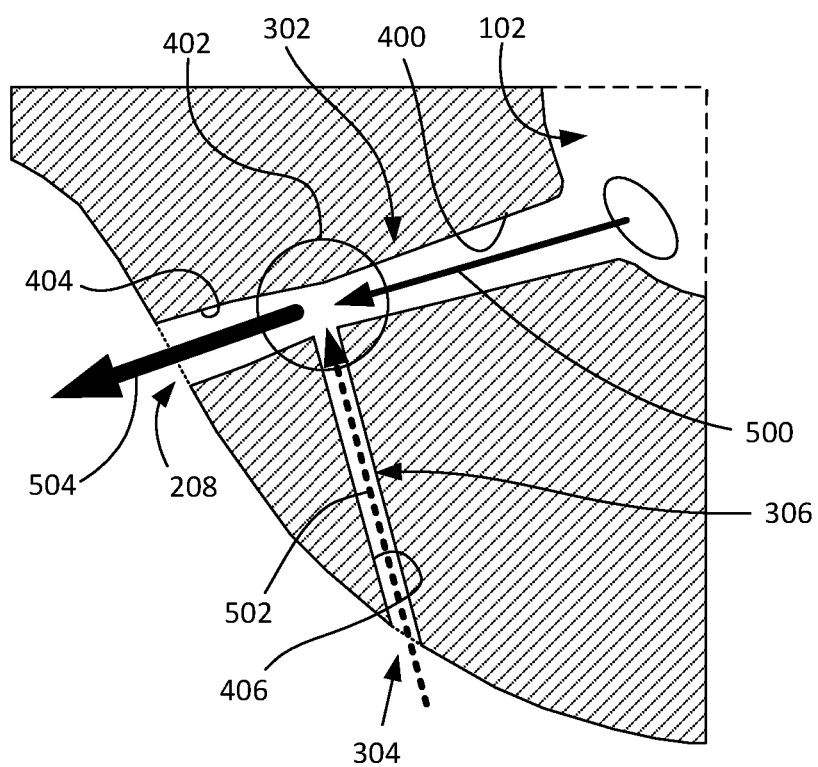
FIGS. 5A and 5B are further enlarged, cross-sectional views of a portion of the fuel injector of FIG. 2.

FIG. 5A shows how the different passages operate according to some embodiments. When liquid fuel is injected from the sac 102, the fuel passes through the first portion 400 of the primary passage 302 in the direction shown by a thin continuous arrow 500. Simultaneously, air is introduced from the air hole 304 through the passage portion 406 of the secondary passage 306 in the direction shown by a dotted arrow 502. The fuel and air are mixed at the second portion 402 (shown with a circle in the figure) of the primary passage 302, and the resulting mixture of fuel and air is injected in the direction shown by a bold arrow 504 through the third portion 404 of the primary passage 302 and exits from the spray hole 208. Air is introduced through pressure differential between the fluid pressures within the primary passage 302 and the secondary passage 306. That is, the fluid pressure within the primary passage 302 (or more specifically, the fluid pressure within the second portion 402 of the primary passage 302) is lower than the fluid pressure within the secondary passage 306, causing the air external to the apparatus 200 to be introduced into the low-pressure environment within the primary passage 302. As shown by the Venturi effect, the Venturi geometry of the primary passage 302 ensures that the second portion 402, which is the most constricted section of the primary passage 302 (or alternatively, the section with the smallest cross-sectional area or smallest diameter, as suitable), experiences a reduction in fluid pressure therein.

Figure 5B:
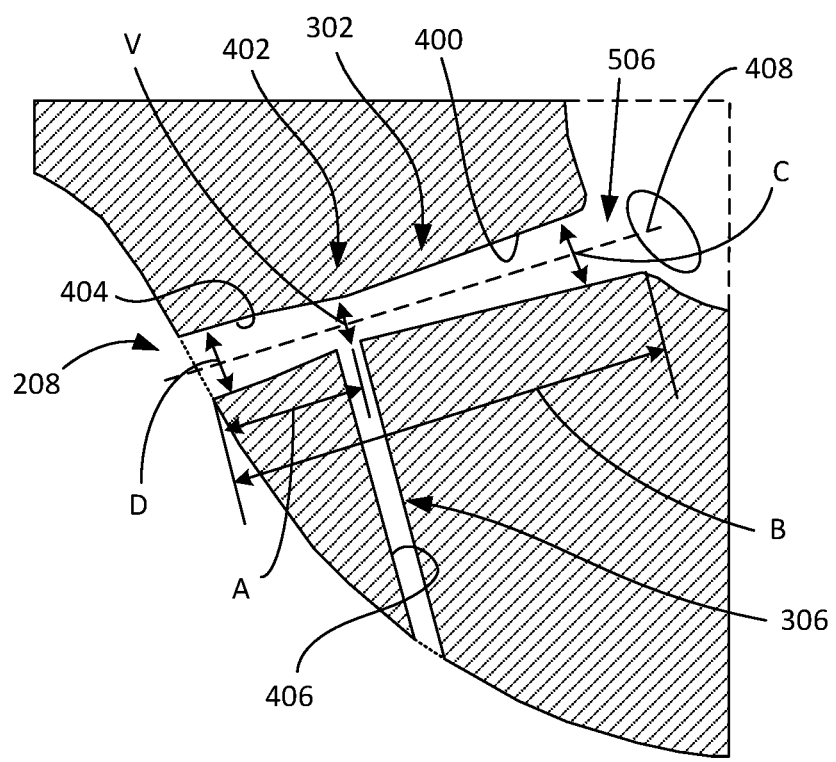

FIG. 5B shows the different dimensions of the first portion 400, second portion 402, and third portion 404 as well as the primary passage 302 and the secondary passage 306, with respect to each other. As shown the first portion 400, second portion 402, and third portion 404 are located along the axis 408, such that the axial location of the second portion 402 can be anywhere along a length "B" of the primary passage 302 as measured from an inlet spray hole 506 to the outlet spray hole 208 on the outer surface 301 along the axis 408. As such, the relationship between the length "B" and a distance "A" of the second portion 402 from the outlet spray hole 208 on the outer surface 301, also measured along the axis 408, can be written as: $0<A/B<1$. Furthermore, the relationship between a cross-sectional length "C" of the first portion 400 at the inlet spray hole 506 and a cross-sectional length "V" of the second portion 402 can be written as: $0<V/C<1$. Similarly, the relationship between a cross-sectional length "D" of the third portion 404 at the outlet spray hole 208 and a cross-sectional length "V" of the second portion 402 can be written as: $0<V/D<1$. In some examples, the cross-sectional length is defined as the longest diagonal length in a cross-section of the component. In some examples, the cross-sectional length is a diameter of the cross-section.

Figure 6:
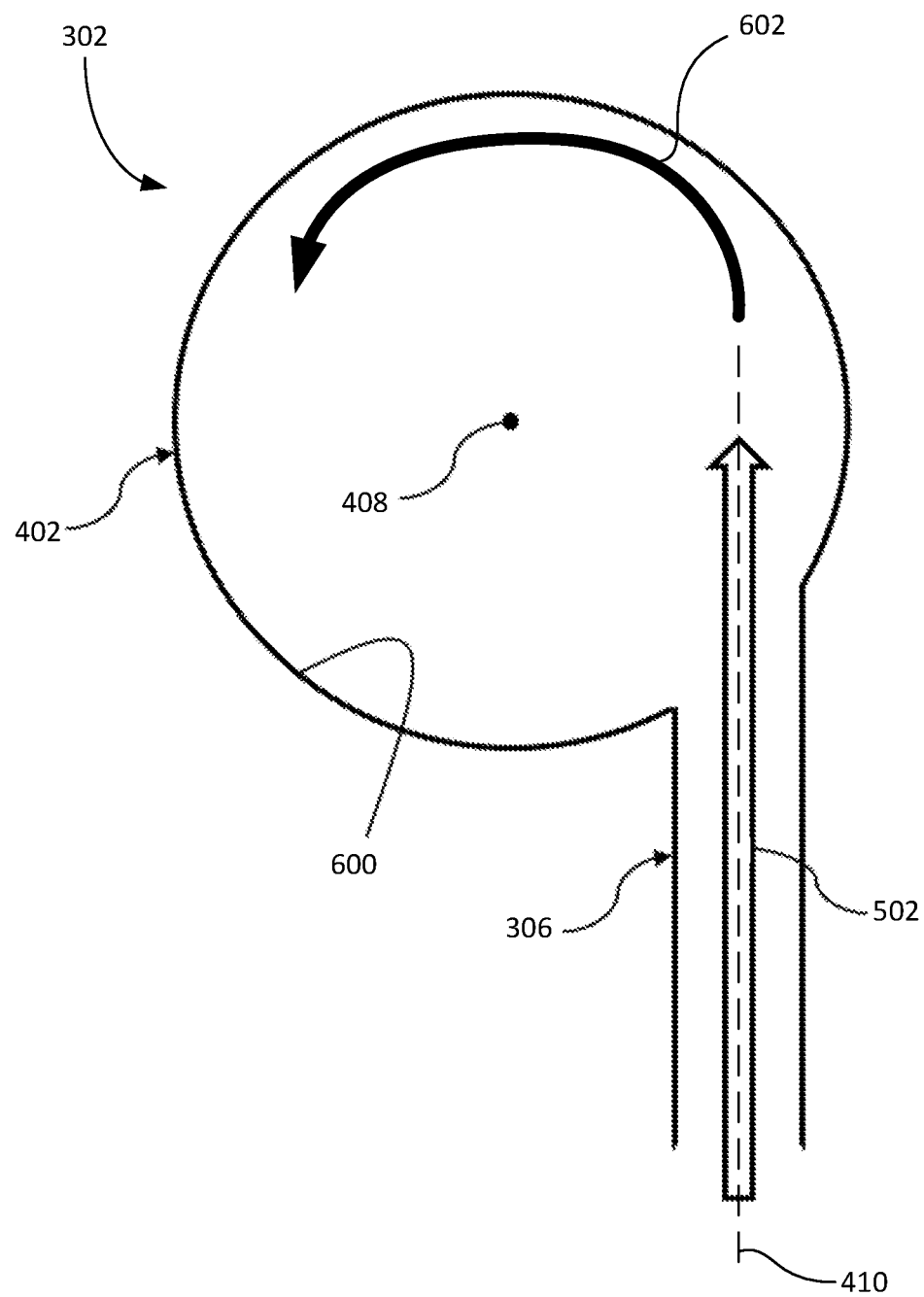
FIG. 6 is a conceptual diagram depicting an orientation of components of the fuel injector of FIG. 2.

FIG. 6 shows a cross-sectional view of the second portion 402 of the primary passage 302 from the perspective of the central axis 408. As shown, the second portion 402 of the primary passage 302 in this example has a circular cross-section, the center of which is the central axis 408 which runs longitudinally through the primary passage 302. The secondary passage 306 comes into fluid contact with the primary passage 302 at the second portion 402, as shown, such that the external air can be introduced into the second portion 402 in the direction shown by the arrow 502 along the central axis 410 of the secondary passage 306. The central axis 410 of the secondary passage 306 is offset from the central axis 408 of the primary passage 302 such that the two axes 408 and 410 do not intersect. Therefore, the two axes 408 and 410 may be defined as being nonplanar with respect to each other. Alternatively, the secondary passage 306 itself may be positioned to be offset from the center or centroid (shown by the central axis 408 in the figure) of the second portion 402. As such, when air is introduced into the primary passage 302, the direction of the introduced air is directed toward an inner surface 600 of the second portion 402 and moves along the contour, curve, or any other configuration formed by the inner surface 600 as the air mixes with the fuel coming from the exit hole 300.

An example of the direction of motion made by the introduced air is shown with a bold arrow 602. In this example, the inner surface 600 forces the air to make a counterclockwise turn as it mixes with the fuel, which may be directed into or out of the page, depending on whether FIG. 6 is viewed from the perspective of the exit hole 300 or the spray hole 208. The "swirling" motion made by the fuel and the air as they form the fuel-and-air mixture may be beneficial in increasing the combustion efficiency of the engine due to the better mixing of fuel and air as a result of the aforementioned motion enabled by the air entering off-axis from the central axis 408 of the primary passage 302.

Figure 7:
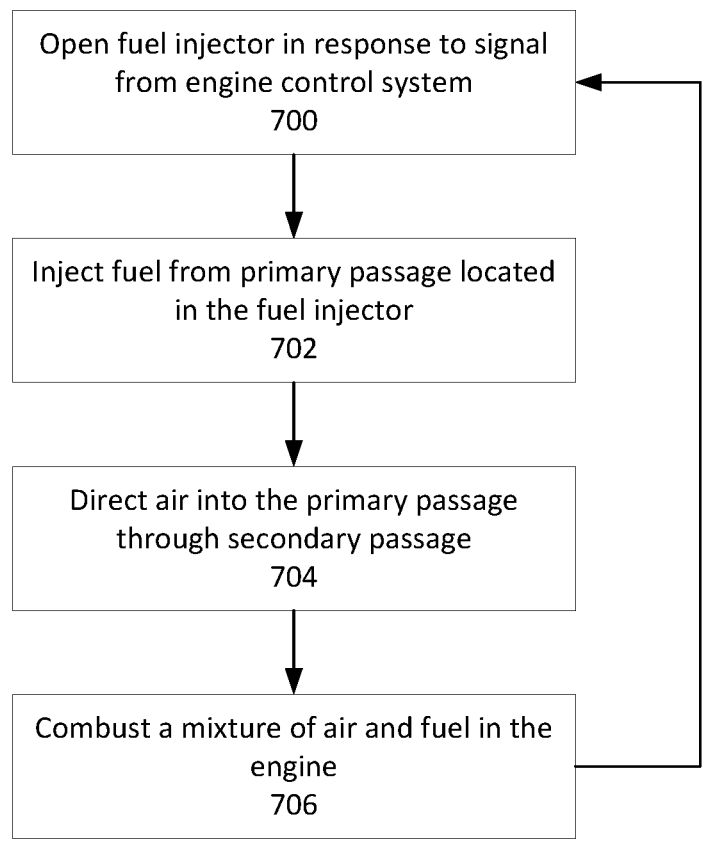
FIG. 7 is a flow diagram of a method of operating a fuel injector as disclosed herein according to an embodiment Corresponding reference characters indicate corresponding parts throughout the several views. The exemplifications set out herein illustrate exemplary embodiments of the disclosure and such exemplifications are not to be construed as limiting the scope of the disclosure in any manner. While the present disclosure is amenable to various modifications and alternative forms, specific embodiments have been shown by way of example in the drawings and are described in detail below. The intention, however, is not to limit the present disclosure to the particular embodiments described. On the contrary, the present disclosure is intended to cover all modifications, equivalents, and alternatives falling within the scope of the present disclosure as defined by the appended claims.

FIG. 7 shows a flow chart describing a method of fuel injection using the apparatus 200 as described herein, where the apparatus 200 is a fuel injector. In block 700, an engine control system functionally coupled to the fuel injector signals the fuel injector to open. In block 702, the fuel is injected or sprayed from the primary passages located in the fuel injector into an engine, which may be an internal combustion engine. In block 704, while injecting fuel through the primary passages, air is injected through the secondary passages that are in fluid connection with the primary passages and subsequently introduced into the primary passage, or more specifically into the second portions (the portion with the smallest cross-sectional area) of the primary passages as previously explained. The redirecting of the air into the secondary passages is due to the pressure differential between the primary passage and the secondary passage as previously explained. Thereafter, in block 606, fuel and air inside the engine are mixed together and combustion occurs to move a plurality of pistons within the engine. In a gasoline engine, such combustion occurs as a result of the fuel mixing with the air, compressed by pistons, and ignited by sparks from sparkplugs. In a diesel engine, the air is first compressed, and the fuel is subsequently injected, which directly causes ignition because the air is heated up when compressed. Thereafter, the process proceeds back to block 600. This process continues for as long as necessary as determined by the engine control system.

It is to be understood that the apparatus 200 as mentioned herein may be used as a fuel injector in an engine system, which include a plurality of cylinder heads, a plurality of fuel injectors, and a plurality of pistons, among other components typically found in an engine system. The cylinder head defines a combustion chamber in which combustion of the fuel-and-air mixture takes place, and each fuel injector is coupled with one of the cylinder heads such that the fuel injector is in fluid communication with the combustion chamber. Also, each piston is located or coupled with a combustion chamber such that the combustion within the chamber propels the piston. In one embodiment, each fuel injector has an inner sac with one or more primary passages extending therefrom, where each primary passage injects fuel into the combustion chamber. The primary passage has the Venturi geometry defined by a first portion, a second portion, and a third portion, where the second portion is disposed between the first portion and the third portion and has the smallest cross-sectional area among the three portions. For each primary passage there is a secondary passage extending from the combustion chamber to fluidly couple with the second portion of the primary passage, and the secondary passage injects air from the combustion chamber to form the fuel-and-air mixture with the fuel injected from the primary passage, which is used to cause the combustion inside the combustion chamber.

Advantages in having the Venturi geometry in the primary passage 302 and the secondary passage 302 fluidly contacting the primary passage 302 at the most constricted section thereof, as disclosed herein, include increased fuel and air mixing within the combustion chamber and improved combustion efficiency, as well as eliminating the need for a pressurized air-assisted injection. Additionally, it can potentially help reduce aftertreatment complexity for heavy duty and large engine frames because of the increased combustion efficiency. For example, in some cases, the rail pressure in a high-pressure injection system can be lowered to reduce parasitic losses which are caused by many of the auxiliary components within the engine such as the oil pump, water pump, fuel pump, and air compressor, among others, as well as friction, lash, and other losses occurring in the drivetrain. Reducing the fuel pressure can reduce some of the parasitic losses, but at the same time causes the problem of poorer spray atomization. For example, on the initial injection of fuel into an air-filled intake manifold of the engine, there may be a possibility that the fuel that is being sprayed into the engine does not have a droplet size that is sufficiently small. Smaller droplets vaporize more quickly than larger ones, so they generally enable a more rapid and efficient combustion. Because of the reduction in combustion efficiency may outweigh the amount of parasitic losses that is also being reduced, injecting air back into the fuel injector can provide considerable advantages, since mixing the air into the fuel stream when the fuel is injected from the fuel injector can enhance the spray atomization, thereby creating a finer spray of fuel with smaller droplet size and enabling the reduction to the parasitic losses while maintaining lower fuel pressures.

Furthermore, during the combustion cycle, some of the charge air is not completely used up after the fuel and air mixture is combusted to move the cylinders. As such, the unused air is oftentimes stagnant in the center of the combustion chamber as secondary air flows, such as swirls and tumbles, which decay quickly during the combustion process. Thus, positioning the air holes in the vicinity of the center of the combustion chamber can help utilize the unused air, leading to a more complete usage of the charge air, thus potentially reducing the amount of unburned hydrocarbon in the system, and resulting in less hydrocarbon to be burned (oxidized) in the diesel oxidation catalyst (DOC) within the exhaust aftertreatment system of the diesel engine, for example. Additionally, during the combustion process, temperature of the air injected through the air holes steadily increases, resulting in a higher temperature at the tail of the spray plumes. This can aid in reducing soot formations within the engine system without significantly impacting the NOx formation as the flame front temperatures are mainly unaffected.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more."

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic with the benefit of this disclosure in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An apparatus for fuel injection, comprising:
   an inner sac with one or more primary passages extending therefrom, the one or more primary passages configured to inject fuel therethrough and comprising a first portion, a second portion, and a third portion, wherein the second portion is disposed between the first portion and the third portion and has a cross-sectional area smaller than that of both the first portion and the third portion; and
   one or more secondary passages extending from an outer surface of the apparatus to fluidly couple with the second portion of the one or more primary passages, the one or more secondary passages configured to pass air therethrough to form fuel-and-air mixture with the fuel injected from the one or more primary passages,
   wherein each of the one or more primary passages defines a first central axis, and each of the one or more secondary passages defines a second central axis, such that the first and second central axes are offset from and nonplanar with each other to cause a swirling motion of air injected into the second portion of the one or more primary passages.

2. The apparatus of claim 1, wherein each of the one or more primary passages is fluidly coupled with a single secondary passage of the one or more secondary passages.

3. The apparatus of claim 2, wherein the first and second central axes are configured to cause the swirling motion in the injected air when mixing with the fuel to form the fuel-and-air mixture.

4. The apparatus of claim 2, wherein a location of the first central axis is defined by a centroid on a cross-section of the primary passage, and a location of the second central axis is defined by a centroid on a cross-section of the secondary passage.

5. The apparatus of claim 1, wherein each of the one or more primary passages is angularly offset from a longitudinal axis of the apparatus, and each of the one or more secondary passages is angularly offset from the one or more primary passages.

6. The apparatus of claim 1, wherein each of the one or more primary passages is fluidly coupled with only one of a plurality of the secondary passages.

7. The apparatus of claim 1, wherein each of the one or more primary passages has a configuration resembling an hourglass shape.

8. The apparatus of claim 1, wherein the one or more secondary passages have a cylindrical configuration.

9. The apparatus of claim 1, wherein the one or more secondary passages have a frustoconical configuration.

10. The apparatus of claim 1, wherein the one or more secondary passages are configured to inject the air therethrough using a fluid pressure differential between the one or more primary passages and the one or more secondary passages.

11. The apparatus of claim 2, wherein a relationship between a length ("B") of the primary passage and a distance ("A") of the second portion from the outer surface, as measured along the first central axis, is represented as: $0<A/B<1$.

12. The apparatus of claim 1, wherein a relationship between a diameter ("V") of the second portion and a diameter ("C") of the first portion is represented as: $0<V/C<1$.

13. The apparatus of claim 1, wherein a relationship between a diameter ("V") of the second portion and a diameter ("D") of the third portion is represented as: $0<V/D<1$.

14. A method of conducting fuel injection in an engine, comprising:
opening a fuel injecting apparatus in response to an operation signal from an engine control system;
inserting fuel through a primary passage formed in the fuel injection apparatus, the primary passage comprising a first portion, a second portion, and a third portion, wherein the second portion is disposed between the first portion and the third portion and has a cross-sectional area smaller than that of both the first portion and the third portion;
directing air into the primary passage through a secondary passage that is fluidly coupled with the second portion of the primary passage, wherein the primary passage defines a first central axis, and the secondary passage defines a second central axis, such that the first and second central axes are offset from and nonplanar with each other to cause a swirling motion of air injected into the second portion of the one or more primary passages; and
combusting a mixture of air and fuel inside the engine.

15. The method of claim 14, wherein redirecting the air into the fuel passage occurs in response to a pressure differential the primary passage and the secondary passage, wherein the primary passage has a lower pressure than the secondary passage.

16. An engine system comprising:
a plurality of cylinder heads, each cylinder head defining a combustion chamber;
a plurality of fuel injectors, each fuel injector coupled with one of the plurality of cylinder heads and comprising:
an inner sac with one or more primary passages extending therefrom, the one or more primary passages configured to inject fuel into the combustion chamber and comprising a first portion, a second portion, and a third portion, wherein the second portion is disposed between the first portion and the third portion and has a cross-sectional area smaller than that of both the first portion and the third portion, and
one or more secondary passages extending from the combustion chamber to fluidly couple with the second portion of the one or more primary passages, the one or more secondary passages configured to inject air from the combustion chamber to form fuel-and-air mixture with the fuel injected from the one or more primary passages, wherein each of the one or more primary passages defines a first central axis, and each of the one or more secondary passages defines a second central axis, such that the first and second central axes are offset from and nonplanar with each other to cause a swirling motion of air injected into the second portion of the one or more primary passages; and
a plurality of pistons, each piston coupled to the combustion chamber of the one of the plurality of cylinder heads.

17. The apparatus of claim 1, wherein the one or more secondary passages consists of one secondary passage, and the first central axis of one primary passage is offset from and nonplanar with the second central axis of the one secondary passage to cause the swirling motion of the fuel-and-air mixture as a result of air injected from the one secondary passage entering into the one primary passage off-axis from the first central axis of the one primary passage.

18. The method of claim 14, wherein the one or more secondary passages consists of one secondary passage, and the first central axis of one primary passage is offset from and nonplanar with the second central axis of the one secondary passage to cause the swirling motion of the fuel-and-air mixture as a result of air injected from the only one secondary passage entering into the one primary passage off-axis from the first central axis of the one primary passage.

19. The system of claim 16, wherein the one or more secondary passages consists of one secondary passage, and the first central axis of one primary passage is offset from and nonplanar with the second central axis of the one secondary passage to cause the swirling motion of the fuel-and-air mixture as a result of air injected from the only one secondary passage entering into the one primary passage off-axis from the first central axis of the one primary passage.

* * * * *